Figure 1:
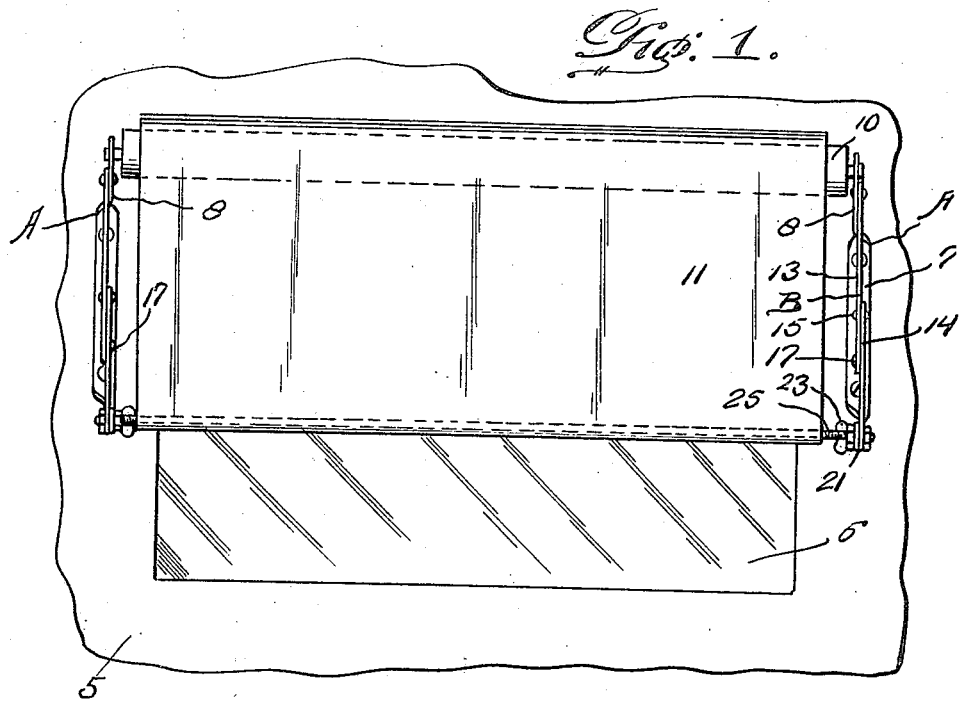

Dec. 7, 1926.

A. IBOLD

AWNING

Filed Oct. 5, 1925

1,609,821

Inventor
Adolph Ibold,
By Clarence A. O'Brien
Attorney

Patented Dec. 7, 1926.

1,609,821

UNITED STATES PATENT OFFICE.

ADOLPH IBOLD, OF DENVER, COLORADO.

AWNING.

Application filed October 5, 1925. Serial No. 60,549.

The present invention relates to an awning structure particularly designed for the doors of sedans and other closed types of automobile bodies.

The object of the invention is to provide an awning structure which may be extended when desired or which may be easily and quickly disposed in a folded position.

The object above mentioned is carried out by an exceedingly simple construction, one which is thoroughly reliable and efficient in use, inexpensive to manufacture, strong, durable, not likely to easily become out of order, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing—

Figure 2:
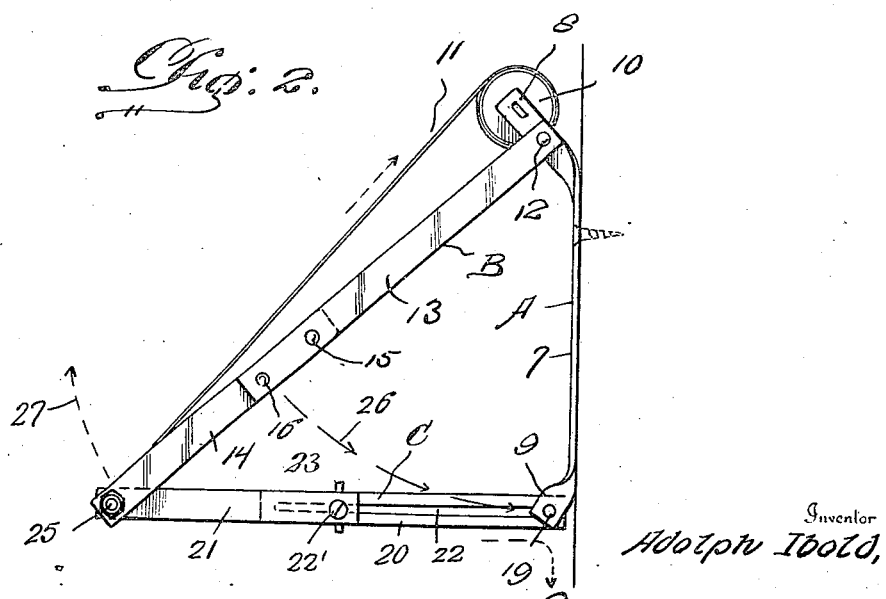

Figure 1 is an elevation of the awning showing the same on the outside of a door or the like of a sedan or like closed type of automobile body, and Fig. 2 is an end elevation of the awning.

Referring to the drawing in detail, it will be seen that the numeral 5 designates a door or any other side portion of an automobile body of the closed type having a glass panel or window 6 mounted therein in any usual or conventional manner.

My awning structure is carried by a pair of plates A. Each plate A includes a body portion 7 having its lower and upper ends twisted and bent outwardly therefrom, the upper end being indicated by the numeral 8 and the lower end by the numeral 9. It is to be noted that the plane of the ends 8 and 9 is rectangularly disposed to the plane of the body 7. A spring roller 10 is mounted between the ends 8 and has a strip of flexible material such as canvas windable thereon and indicated by the numeral 11.

The spring roller normally holds the strip 11 wound thereon. A pair of arms B have their upper ends pivoted as at 12 to the ends 8. These arms B are formed in two sections 13 and 14 pivoted together as at 15. The section 13 or 14 is provided with a struck-out projection 16 for being received in a struck-out seat 17 in the adjacent section 14 or 13 so that the sections may be held in alinement as is shown in Fig. 2 against accidental displacement into an angular relationship.

A pair of arms C are pivoted to the ends 9 as at 19. Each arm C includes a section 20 and a section 21. The section 20 is provided with a longitudinally extending slot 22 which receives the pivot 19. A bolt 22′ pierces the section 21 and extends through the slot 22 so that by adjustment of the thumb nut 23, the bolt 22′ is loosened so that the sections 20 and 21 may be moved to lengthen or shorten the arm or may be swung to an angular relationship with each other. A rod 25 pierces the ends of sections 14 and 21 of the arms B and C respectively, pivoting said arms together, and the extremity of the strip 11 is engaged with said rod as is indicated in Fig. 1.

When the awning is in the extended position shown in Fig. 2, it will be seen that the bolts 22′ may be loosened and the sections 13 and 14 swung to angular positions in the direction of the arrows 26. This will cause the rod 25 to swing in the direction of the arrow 27 causing the strip to wind on the spring roller 10 as catch 16—17 is released to allow the joint in arms B to break at 15. The sections 13 and 14 will depend vertically from the pivot 12 with the sections 14 folded over the sections 13 and of course, the slotted sections 20 will slide over the pivots 19.

It is thought that the construction, operation, and the utility of the invention as well as its advantages will now be clearly understood without a more detailed description thereof. The present embodiment of the invention has been disclosed merely by way of example since in actual practice it attains the features of advantage enumerated as desirable in the statement of the invention and the above description. It will be apparent that numerous changes in the details, of construction and in the combination and arrangement of parts may be resorted to without departing from the spirit or scope of the invention as hereinafter claimed or sacrificing any of its advantages.

Having thus described my invention, what I claim as new is:—

1. An awning of the class described including a pair of brackets adapted to be attached to a support, the upper and lower ends of said brackets being offset, a spring roller mounted between the upper ends of the brackets, arms pivoted to the upper ends of said brackets, said arms each including a pair of pivoted sections, a second pair of arms pivoted to the lower ends of the brackets, said second mentioned arms being formed in sections adjustably associated with each other, the arms of the first pair being pivoted to the arms of the second pair, and means for attaching a strip to the ends of the arms, said strip being windable over said spring rollers.

2. An awning of the class described including a pair of brackets having offset upper ends, a spring roller between the offset upper ends, a strip windable on said spring roller, a pair of arms pivoted to the offset ends, each arm including a pair of sections pivoted together and having a snap fastening structure for holding them normally in alinement, and means extending from the bracket to hold said arms extended outwardly, and means for attaching the end of the strip to the ends of said arms.

3. An awning of the class described including a pair of brackets adapted to be attached to a support and having their upper ends apertured for receiving a spring roller, arms pivoted to the upper ends of said brackets, said arms each including a pair of pivoted sections, a second pair of arms pivoted to the lower ends of the brackets, said second arms being formed in sections adjustably associated with each other, the arms of the first pair being pivoted to the arms of the second pair and beams for attaching a strip which is windable on the spring roller to the ends of the arms.

In testimony whereof I affix my signature.

ADOLPH IBOLD.